United States Patent [19]
Daniel

[11] 3,784,013
[45] *Jan. 8, 1974

[54] MULTI-UNIT APPARATUS FOR COLLECTING OIL FROM THE SURFACE OF A BODY OF WATER

[76] Inventor: William H. Daniel, 541 Putman Rd., Rogers, Ark. 72756

[ * ] Notice: The portion of the term of this patent subsequent to June 6, 1989, has been disclaimed.

[22] Filed: Feb. 8, 1971

[21] Appl. No.: 113,555

[52] U.S. Cl............................ 210/242, 210/DIG. 21
[51] Int. Cl............................................. E02b 15/04
[58] Field of Search..................... 210/242, DIG. 21, 210/83

[56] References Cited
UNITED STATES PATENTS
3,500,841  3/1970  Logan........................... 210/DIG. 21

Primary Examiner—Frank A. Spear, Jr.
Assistant Examiner—T. A. Granger
Attorney—Young & Thompson

[57] ABSTRACT

Oil is collected from the surface of a body of water by immersing a tent-shaped collector from above the surface of the water to a depth such that the hydrostatic pressure of the oil in the collector will pump oil to an elevation above the surface of the water and into a collection receptacle. The collector slides vertically on a conduit and delivers the oil into the lower end of the conduit, the lower end of the conduit being positioned at a depth which determines the height to which the oil can be pumped above the surface of the water. The tent-shaped collector is in the form of a plurality of superposed coaxial cones mounted on a sleeve that slides on a hollow multiperforate stem.

5 Claims, 8 Drawing Figures

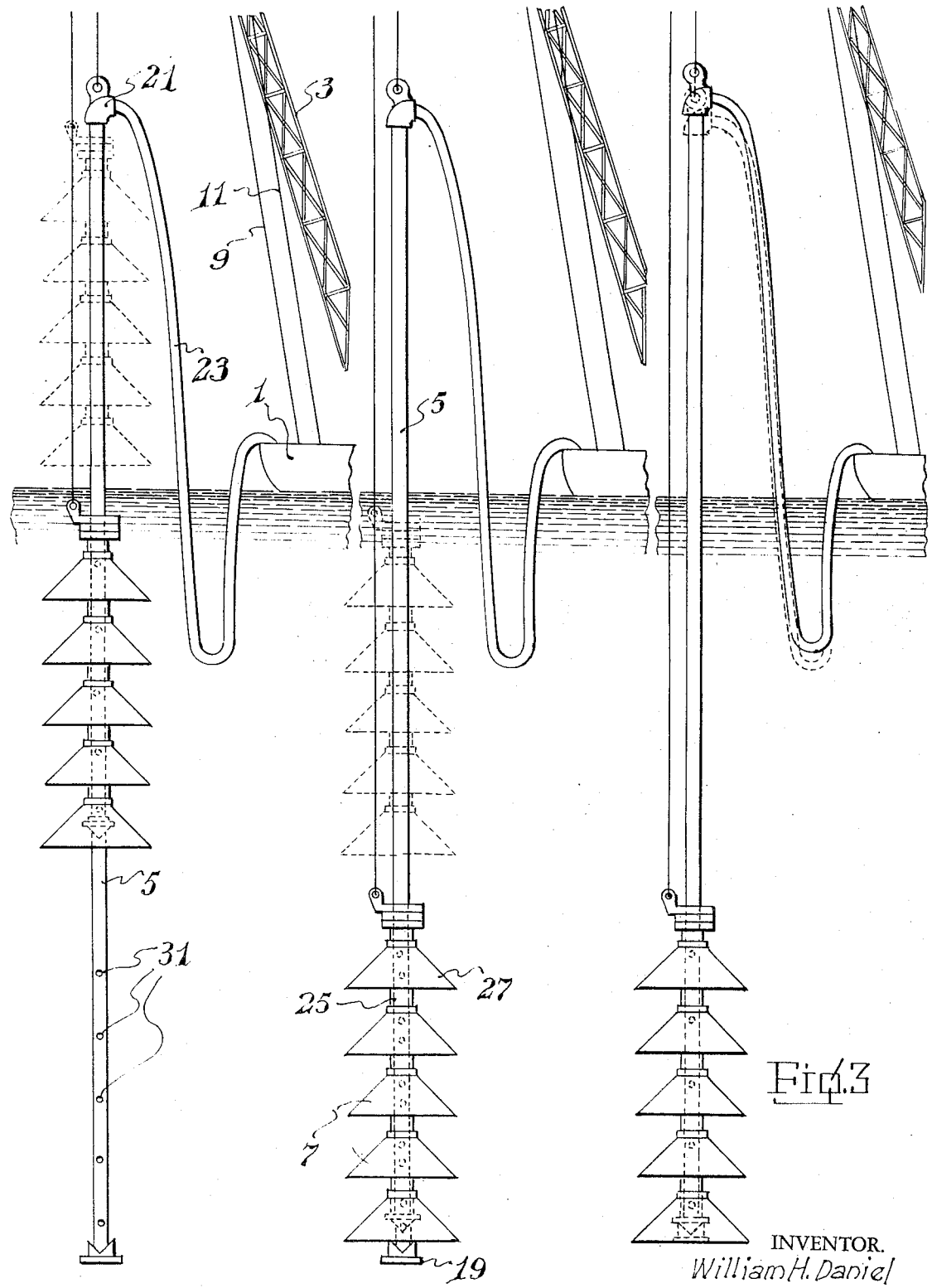

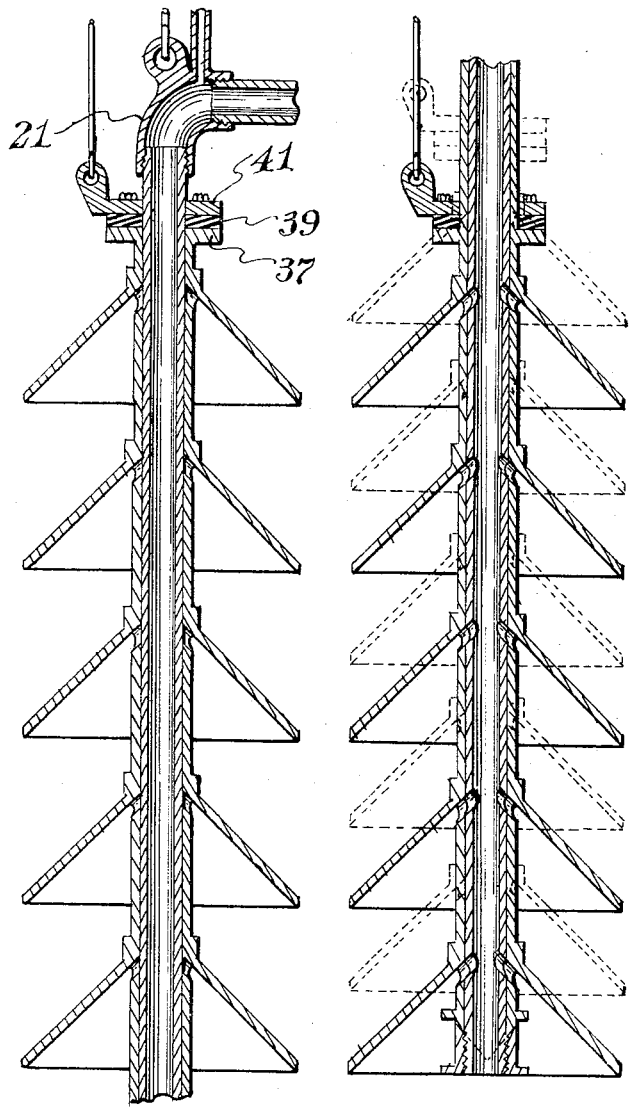
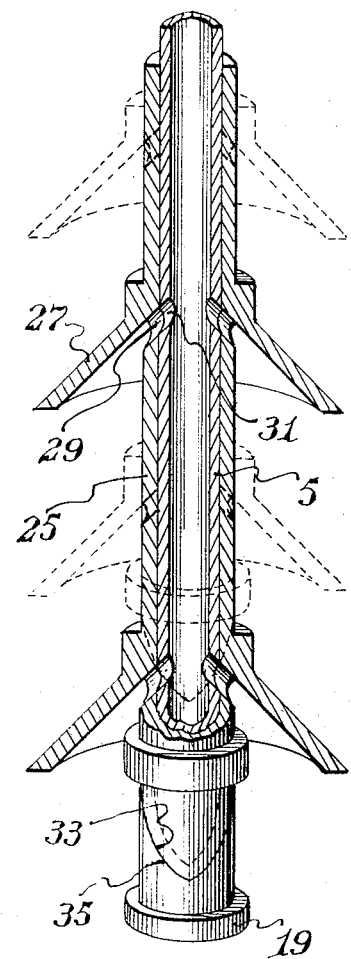
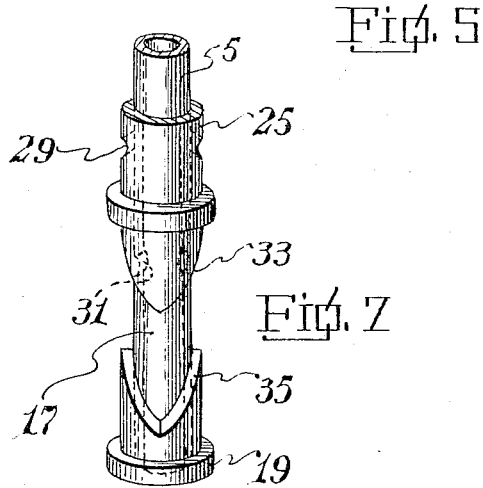
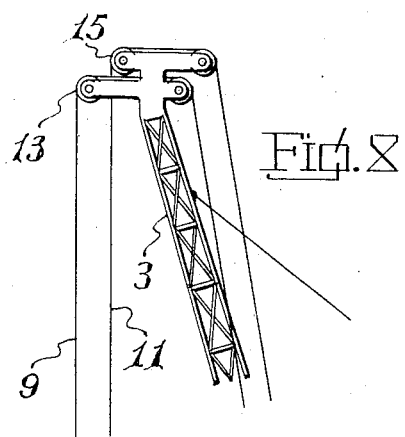
Fig. 4  Fig. 5  Fig. 6  Fig. 7  Fig. 8
INVENTOR.
William H. Daniel
BY Young & Thompson
ATTORNEYS

MULTI-UNIT APPARATUS FOR COLLECTING OIL FROM THE SURFACE OF A BODY OF WATER

The present invention relates to apparatus for collecting oil from the surface of a body of water, more particularly of the type in which oil spills are cleaned up by effecting a water-oil separation and removing the oil, and discloses subject matter related to that of my U.S. Pat. No. 3,667,610, issued June 6, 1972.

When oil spills on or in a body of water, it tends to form a large slick which is a more or less thin layer of oil floating on the water. To clean up the oil slick, it is necessary to remove the oil from the surface of the water, and this of course can be attempted in many ways. At present, removal by mechanical collection seems to be the most feasible method.

A number of proposals have been made of ways to skim oil from water. These skimming procedures for the most part rely on confining and removing laterally in a horizontal direction oil from the water, thereby to accumulate a body of oil of a depth greater than the depth assumed by the unconfined oil.

In fact, however, the water on which oil slicks occur is often wave tossed, and the layer of oil on water is accordingly not flat. Thus, the most effective skimming devices so far have been confronted with the serious problem that, under actual conditions, what is actually skimmed is more air and water than oil.

The present invention constitutes a radical departure from oil-skimming techniques known heretofore and operates according to principles never before used by anyone other than the present inventor, in the collection of oil from the surface of a body of water. In particular, the present invention collects oil from the surface of the water, regardless of the contour or wave motion of the water, not by moving the oil in a horizontal direction relative to the water but rather by moving the oil downwardly beneath the surface of the water, and then upwardly. Having regard for the differential specific gravities of oil and water, the downward movement of the oil beneath the surface of the water imparts to the oil the ability to perform the work of elevating the separated oil a substantial distance above the surface of the water, that distance of course varying according to the depth to which the oil is sunk before it is permitted to rise.

Accordingly, it is an object of the present invention to provide apparatus for collecting oil from the surface of a body of water, which operates well in rough water.

Another object of the present invention is the provision of such an apparatus, which uses hydrostatic pressure to pump the oil to an elevation a substantial distance above the surface of the water.

Finally, it is an object of the present invention to provide such an apparatus which will be relatively simple and inexpensive to manufacture, easy to operate, maintain and repair, and rugged and durable in use.

Briefly, and very broadly, according to the present invention, a tent-like structure is immersed from a position above the surface of the water to a position below the surface of the water thereby confining and forcing downwardly an area of oil on the surface of the water to a depth lower than would otherwise be assumed by the relatively buoyant oil. The area of the submerged oil patch is then decreased by the tendency of the oil to move to the top of the tent-like structure, and the oil thus concentrated is permitted to flow into the lower portion of a vertical conduit, in which it tends to flow upwardly under hydrostatic pressure. The tent-like structure is repeatedly raised and lowered, thereby repeatedly introducing oil into the conduit, so that the liquid in the conduit rises to a height above the surface of the surrounding water such that the total weight of the liquid in the conduit is no greater than the weight of an identical column of water alone whose height is no greater than the depth of submergence of the conduit. Oil thus flowing from the upper end of the conduit is collected and maintained separate from the body of water. The tent-like structure is in the form of a plurality of superposed coaxial cones mounted on a common vertical cylindrical sleeve that slides on a vertical hollow multiperforate stem, the sleeve having holes therethrough at upper portions of the undersides of the cones that register with the holes through the stem.

Other objects, features and advantages of the present invention will become apparent from a consideration of the following description, taken in connection with the accompanying drawings, in which:

FIG. 1 is an elevational view of apparatus according to the present invention at an early stage of operation in which the tent-like structure is shown in phantom line posed above the surface of the water and in full line immersed;

FIG. 2 is a view similar to FIG. 1 but showing movement from the phantom line to the full-line position in which the tent-like structure is at or adjacent the bottom of its path of movement but the registering openings are not yet in registry to permit upward oil flow;

FIG. 3 is a view similar to FIG. 2 but showing the parts in the position they occupy when the holes are in registry and oil passes from the undersides of the cones comprising the tent-like structure into the stem for upward flow therein;

FIGS. 4 and 5 are enlarged fragmentary cross-sectional views showing the position of the tent-like structure at the upper and lower ends, respectively, of its path of vertical movement;

FIG. 6 is a further enlarged fragmentary cross-sectional view showing the lower end of the apparatus according to the present invention, in the lowermost position of the tent-like structure;

FIG. 7 is a fragmentary view showing the lower end of the structure when the holes are not in registry with each other; and FIG. 8 is a fragmentary elevational view of the upper end of the derrick boom by which the structure of the present invention may be raised and lowered and its components moved vertically relative to each other.

Referring now to the drawings in greater detail, there is shown apparatus according to the present invention, comprising a ship or barge 1 that is adapted to move across the surface of a body of water on which the oil spill occurs, to the site of the oil spill, and to carry the rest of the apparatus according to the present invention and to receive and retain the collected oil. Ship 1 carries a boom 3 vertically and horizontally swingable thereon, from which the collecting apparatus of the present invention is suspended.

The collecting apparatus itself comprises principally a vertical cylindrical conduit of steel pipe or the like in the form of a hollow stem 5 with a tent-like structure 7 encircling it and vertically slidable thereon. Cables 9 and 11 support stem 5 and structure 7, respectively, for vertical movement conjointly with and relative to each other, the cable 9 being reeved over sheaves 13 carried by boom 3 and the cable 11 being reeved over sheaves 15 carried by boom 3. Winches (not shown) mounted on ship 1 individually and/or jointly reel in or pay out cables 9 and 11.

At its lower end 17, stem 5 is surrounded by an enlargement in the form of a stop 19 to limit the downward movement of tent-like structure 7 and to orient structure 7 in a manner that will be described hereinafter. At its upper end, stem 5 is secured to a union 21 to which cable 9 is secured and by which stem 5 is connected in fluid communication with a flexible tube 23 that extends from the upper end of stem 5 to the storage chambers (not shown) for collected oil on ship 1.

Tent-like structure 7 is comprised by a vertical cylindrical sleeve 25 to which are secured a vertically spaced coaxial series of downwardly opening cones 27. Holes 29 that extend diagonally upwardly and inwardly through sleeve 25 immediately beneath the apex of each cone 27 communicate with similar holes 31 through stem 5 in the lowermost position of structure 7 as seen in FIG. 5, thereby to place the upper portions of the spaces beneath cones 27 in fluid communication with the lower portion of the interior of stem 5 for the flow of oil from the former to the latter under hydrostatic pressure.

The lower end of sleeve 25 carries inclined cam surfaces 33 that come to points that interfit in cut-out portions provided by complementary inclined cam surfaces 35 on the upper edges of stop 19. Sleeve 25 is not only vertically slidable on stem 5 but also rotatable relative to stem 5, so that when sleeve 25 approaches its lowermost position on stem 5, the cam surfaces 33 and 35 will interfit and interact to rotate sleeve 25 relative to stem 5 so that holes 29 and 31 register with each other.

At its upper end, sleeve 25 carries a radially outwardly extending horizontal flange 37 that provides one of the two seats for a packing 39 that is releasably compressed between flange 37 and a superposed ring 41 to which cable 11 is secured. When flange 37 and ring 41 are tightened together, packing 39 is in slidable sealing relation with stem 5.

In operation, ship 1 is moved to the site of an oil spill or other accumulation of oil on the surface of a body of water, of course with stem 5 elevated. In the midst of the oil spill, stem 5 is lowered into the water and immerses by its own weight, to the FIG. 1 position. Then with boom 3 and cable 9 held stationary, cable 11 is paid out to immerse structure 7 by its own weight from the phantom line to the full-line position of FIG 1 and successively to the full-line position of FIG. 2. Structure 7 is then further lowered or stem 5 raised, until cam surfaces 33 and 35 bring the parts to the position of FIG. 3 with the holes 29 and 31 in registry with each other.

When the cones 27 successively enter the water from above, they each confine within their periphery a circular or annular layer of oil, which tends to consolidate laterally and increase in vertical height as the entrapped air is compressed by hydrostatic pressure. Cones 27 then continue downwardly to the position of FIGS. 3, 5 and 6, where the air and oil can then flow through the holes 29 and 31 into the interior of stem 5.

This plug of oil and air then moves upwardly through stem 5; and the air is preferably vented through an air vent extending upwardly from union 21 (not shown); although of course it will be realized that oil and air can be carried over to storage and separated on the ship 1.

In any event, the oil being lighter than water, its upper surface will lie somewhat above the surface of the surrounding water level. At this initial stage, the interior of stem 5 below this initial plug of oil can be filled entirely with water which flows in behind or has been displaced downwardly by the oil.

Structure 7 is then raised again to the phantom-line position of FIG 1, and lowered again, to introduce a second plug of oil into the lower end of stem 5, which second plug rises and joins the first, the upper surface of the oil within stem 5 rising still higher above the level of the surrounding water.

After a number of such operations, the level of oil within stem 5 has risen to the level of and filled the union 21, after which oil flows through tube 23 to storage as quantities of oil are successively introduced into the lower end of stem 5. In effect, it is the buoyancy of the collected oil, immersed by structure 7 to a suitable depth, that pumps previously collected oil by hydrostatic pressure to a desired elevation, depending on how deeply the lower end 17 of stem 5 is immersed. Thus, if it is desired to pump oil higher, then stem 5 is immersed deeper, the height of the column of liquid within stem 5 being such that the weight of liquid within stem 5, above and below the surface of the surrounding water, is no greater than the height of a column of water alone of similar cross-sectional area and of a height equal to the depth of immersion of the lower end 17 of stem 5.

From a consideration of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

Having described my invention, I claim:

1. Apparatus for collecting oil from the surface of a body of water, comprising a tent-like structure comprised of a plurality of vertically superposed coaxial downwardly opening cones, an upright conduit immersible in the water, said structure surrounding and sliding on the upright conduit, the conduit having openings adjacent its lower end that communicate with upper portions of the space within each of said cones when said tent-like structure is in a lower position on the said conduit, and means to slide said structure vertically on and relative to said conduit from a position above the surface of the water to a position adjacent the lower end of the conduit whereby in said latter position oil collecting in an upper portion of the space within each said cone flows into said openings and up through said conduit under hydrostatic pressure.

2. Apparatus as claimed in claim 1, said conduit being rigid, and flexible conduit means for removing oil from an upper portion of said rigid conduit.

3. Apparatus as claimed in claim 1, and stop means adjacent the lower end of the conduit to predetermine the lowermost position of said structure on said conduit.

4. Apparatus as claimed in claim 3, said tent-like structure having openings therethrough registrable with said conduit openings in one rotated position of said tent-like structure, said stop means having cam surfaces thereon coacting with cam surfaces on said lower end of said conduit to rotate said structure relative to said conduit thereby to ensure said registry.

5. Apparatus as claimed in claim 1, and a cylindrical sleeve that slides on said conduit, said cones being mounted in vertically spaced relation on said sleeve.

* * * * *